(12) United States Patent
Margot et al.

(10) Patent No.: US 8,490,666 B2
(45) Date of Patent: Jul. 23, 2013

(54) FIRE RESISTANT TIRE

(76) Inventors: Philippe Gerard Germain Margot, Vielsalm (BE); Peter Phelps Roch, Ettelbruck (LU)

( * ) Notice: Subject to any disclaimer, the term of this patent is extended or adjusted under 35 U.S.C. 154(b) by 537 days.

(21) Appl. No.: 12/329,937

(22) Filed: Dec. 8, 2008

(65) Prior Publication Data

US 2010/0139833 A1    Jun. 10, 2010

(51) Int. Cl.
*B60C 1/00*    (2006.01)

(52) U.S. Cl.
USPC ......................................... 152/524

(58) Field of Classification Search
USPC ......................................... 152/524
IPC ..................................... B60C 01/00
See application file for complete search history.

(56) References Cited

U.S. PATENT DOCUMENTS

| | | | | |
|---|---|---|---|---|
| 5,341,862 A * | 8/1994 | Hashimoto et al. | ........ | 152/209.5 |
| 5,531,256 A | 7/1996 | Hashimoto et al. | ........ | 152/209 R |
| 6,096,833 A * | 8/2000 | Araki et al. | .................. | 525/342 |

FOREIGN PATENT DOCUMENTS

| | | | |
|---|---|---|---|
| CN | 1141314 | | 1/1997 |
| CN | 101146857 | | 3/2008 |
| EP | 0542580 | * | 11/1992 |
| EP | 0541367 A1 | | 5/1993 |
| EP | 1219676 A1 | | 7/2002 |
| EP | 1840163 A1 | | 10/2007 |

* cited by examiner

*Primary Examiner* — Joseph S Del Sole
*Assistant Examiner* — David N Brown, II
(74) *Attorney, Agent, or Firm* — John D. DeLong

(57) ABSTRACT

The present invention is directed to a pneumatic tire comprising at least one component, the at least one component comprising a rubber composition, the rubber composition comprising:

at least one diene based elastomer;

from 20 to 40 parts by weight, per 100 parts by weight of elastomer (phr), of silica; and from 10 to 25 weight percent of aluminum hydroxide;

wherein the composition is self-extinguishing at a temperature of 1000° C., and the composition is exclusive of halogenated paraffins and antimony trioxide.

8 Claims, No Drawings

FIRE RESISTANT TIRE

BACKGROUND OF THE INVENTION

Rubber components for use in pneumatic tires typically include various organic-based materials that may be combustible under certain conditions. In particular, on earthmover equipment used to move hot steel slag in steel mills, earthmover tires may contact red-hot slag with temperature in excess of 1000° C. At such temperatures, tires may ignite. Typically, such tires have a significantly shorter useful life, on the order of twenty percent of the tire life seen in normal temperature use.

There is therefore a need for improved tires with resistance to such high temperature environments, as in contact with hot slag, to avoid such a reduction in useful tire life.

SUMMARY OF THE INVENTION

The present invention is directed to a pneumatic tire comprising at least one component, the at least one component comprising a rubber composition, the rubber composition comprising:
  at least one diene based elastomer;
  from 20 to 40 parts by weight, per 100 parts by weight of elastomer (phr), of silica; and
  from 10 to 25 weight percent of aluminum hydroxide;
  wherein the composition is self-extinguishing at a temperature of 1000° C., and the composition is exclusive of halogenated paraffins and antimony trioxide.

DETAILED DESCRIPTION OF THE INVENTION

There is disclosed a pneumatic tire comprising at least one component, the at least one component comprising a rubber composition, the rubber composition comprising:
  at least one diene based elastomer;
  from 20 to 40 parts by weight, per 100 parts by weight of elastomer (phr), of silica; and
  from 10 to 25 weight percent of aluminum hydroxide;
  wherein the composition is self-extinguishing at a temperature of 1000° C., and the composition is exclusive of halogenated paraffins and antimony trioxide.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form styrene-butadiene rubber (SBR), as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 28 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition includes additives to enable the composition to be self-extinguishing at a temperature of 1000° C. By self-extinguishing, it is meant that when exposed to an ignition source at a temperature of 1000° C., any combustion of the rubber composition will cease within one minute due to the flame retardant action of the rubber composition, without any application of outside fire control agents such as water, foam, sand, carbon dioxide, or the like.

The rubber composition includes aluminum hydroxide, Al(OH)$_3$. In one embodiment, the rubber composition includes from about 10 to about 25 percent by weight of aluminum hydroxide. In one embodiment, the rubber composition includes from 12 to 20 percent by weight of aluminum hydroxide.

The presence of some fire retardant materials is avoided in the rubber composition to prevent release of potentially toxic materials during any combustion of the tire. The rubber composition is exclusive of toxic fire retardants, including but not limited to halogenated paraffins and antimony trioxide.

The rubber composition includes from about 20 to about 40 phr of silica. In another embodiment, from 25 to 35 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 20 to 80 phr. In another embodiment, from 30 to 50 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

In one embodiment the rubber composition may contain a conventional sulfur containing organosilicon compound. Examples of suitable sulfur containing organosilicon compounds are of the formula:

Z-Alk-S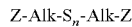-Alk-Z     I in which Z is selected from the group consisting of

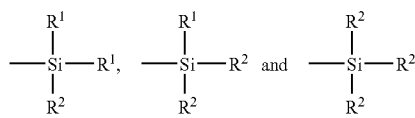

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

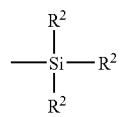

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, the effect of aluminum hydroxide on the fire resistance of a natural rubber compound is illustrated. A series of rubber compounds were prepared using standard amount of curatives and processing aids, along with the additives as shown in Table 1. The rubber compounds were mixed in a standard mix procedure and cured with a standard cure cycle. Samples were tested for self-extinguishing ability by placing a strip of cured compound in a 2000° C. flame. Samples were observed to determine if combustion of the sample was self-quenched within one minute. Samples were further tested for abrasion and tear, with data expressed as a relative value indexed as a fraction of the control. Results are indicated in Table 1.

TABLE 1

All amount in parts by weight, per 100 parts by weight of elastomer (phr) except Aluminum hydroxide, expressed in weight percent.

|  | Sample No. | | | | |
| --- | --- | --- | --- | --- | --- |
|  | 1 | 2 | 3 | 4 | 5 |
| Carbon Black | 40 | 40 | 40 | 40 | 40 |
| Silica | 15 | 15 | 15 | 15 | 15 |
| Silane | 4 | 4 | 4 | 4 | 4 |
| Aluminum Hydroxide (wt %) | 0 | 10 | 20 | 25 | 30 |
| Properties |  |  |  |  |  |
| Tear Index | 1 | 0.71 | 0.52 | 0.3 | 0.2 |
| Abrasion Index | 1 | 0.68 | 0.42 | 0.41 | 0.4 |
| Self quenching at 2000° C. | no | no | no | yes | yes |

As seen from Table 1, Sample 4 with 25 phr of aluminum hydroxide shows self quenching behavior 25 phr. However, the tear and abrasion properties of the rubber composition have decrease to unacceptably low levels.

EXAMPLE 2

In this example, the effect of aluminum hydroxide and silica on the fire resistance of a rubber compound is illustrated. A series of rubber compounds were prepared using standard amount of curatives and processing aids, along with the additives as shown in Table 1. The rubber compounds were mixed in a standard mix procedure and cured with a standard cure cycle. Samples were tested for flame retardancy by placing a ceramic crucible heated to 1000° C. on a block of rubber sample. Samples were observed to determine if combustion of the sample was self-quenched within one minute. Samples were further tested for abrasion and tear, with data expressed as a relative value indexed as a fraction of the control. Results are indicated in Table 2.

TABLE 2

All amount in parts by weight, per 100 parts by weight of elastomer (phr) except Aluminum hydroxide, expressed in weight percent.

|  | Sample No. | | |
| --- | --- | --- | --- |
|  | 6 | 7 | 8 |
| Carbon Black | 32 | 32 | 32 |
| Silica | 28 | 28 | 28 |

TABLE 2-continued

All amount in parts by weight, per 100 parts by weight of elastomer (phr) except Aluminum hydroxide, expressed in weight percent.

| | Sample No. | | |
|---|---|---|---|
| | 6 | 7 | 8 |
| Silane | 0 | 7 | 7 |
| Aluminum Hydroxide, wt % | 0 | 15 | 25 |
| Properties | | | |
| Tear Index | 1 | 0.59 | 0.43 |
| Abrasion Index | 1 | 0.86 | 0.71 |
| Self quenching at 1000° C. | no | yes | yes |

As seen from Table 2, sample 7 with the 28 phr of silica and 15 weight percent aluminum hydroxide showed a self-quenching ability at 1000° C., with acceptable tear and abrasion at the higher silica loading.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component, the at least one component consisting of a rubber composition, the rubber composition consisting of:
   at least one diene based elastomer;
   from 20 to 40 parts by weight, per 100 parts by weight of elastomer (phr), of silica; and
   from 12 to 20 weight percent of aluminum hydroxide; and
   at least one additive selected from the group consisting of carbon black, sulfur containing organosilicon compounds, sulfur donors, curing aids, activators, accelerators, retarders, oils, resins, tackifying resins, plasticizers, fillers, pigments, fatty acid, zinc oxide, waxes, antioxidants, antiozonants and peptizing agents;
   wherein the composition is self-extinguishing at a temperature of 1000° C., and the composition is exclusive of halogenated paraffins and antimony trioxide.

2. The pneumatic tire of claim 1, wherein the amount of silica ranges from 25 to 35 phr.

3. The pneumatic tire of claim 1, wherein the at least one component is a ground contacting tread.

4. The pneumatic tire of claim 1, wherein the at least one component is a sidewall.

5. The pneumatic tire of claim 1, wherein the at least one diene based elastomer is selected from the group consisting of natural rubber, synthetic polyisoprene, polybutadiene and styrene-butadiene rubber.

6. The pneumatic tire of claim 1, wherein the rubber composition comprises from 28 to 40 percent by weight of silica.

7. The pneumatic tire of claim 1, wherein the rubber composition comprises from 28 to 35 percent by weight of silica.

8. The pneumatic tire of claim 1, wherein the rubber composition comprises from 12 to 15 percent by weight of aluminum hydroxide.

* * * * *